Nov. 15, 1966 S. A. MINERA 3,285,294
CAN FILLING MACHINE AND METHOD
Filed Aug. 1, 1963 2 Sheets-Sheet 2
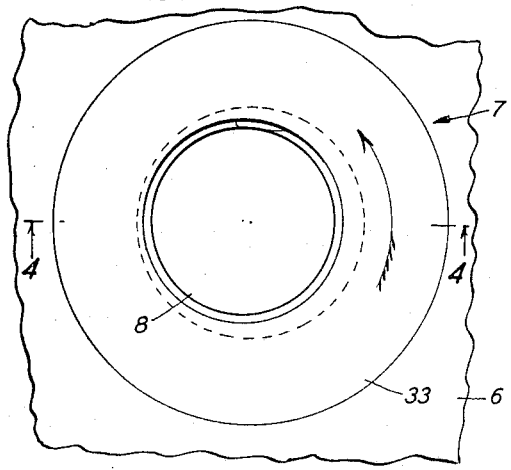
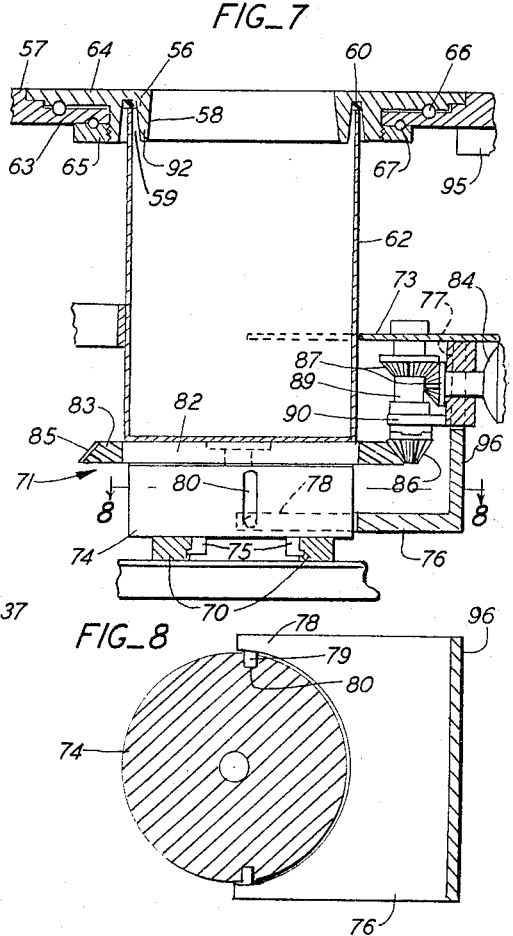
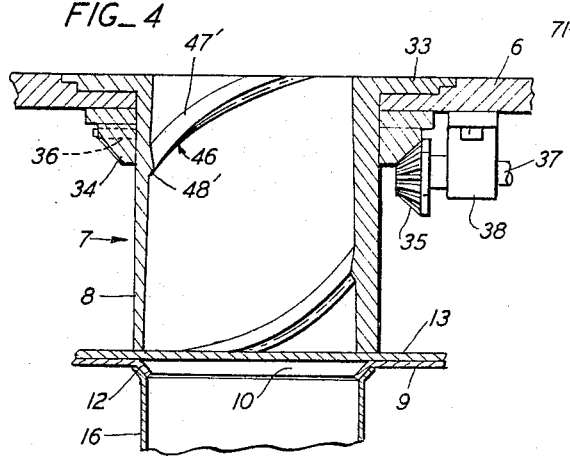
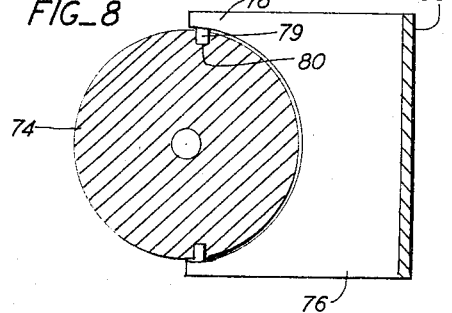
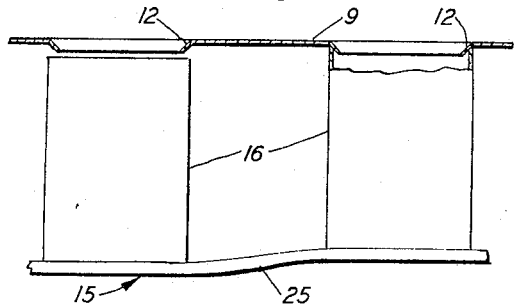
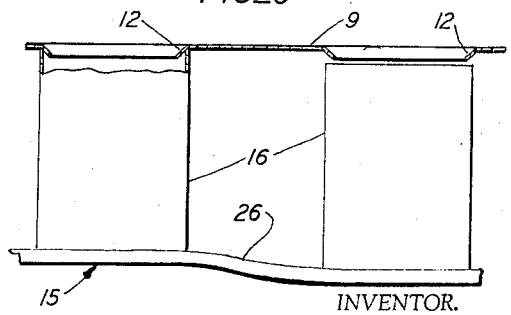
INVENTOR.
SALVADOR A. MINERA
BY
Boyken, Mohler + Foster
ATTORNEYS United States Patent Office 3,285,294
Patented Nov. 15, 1966

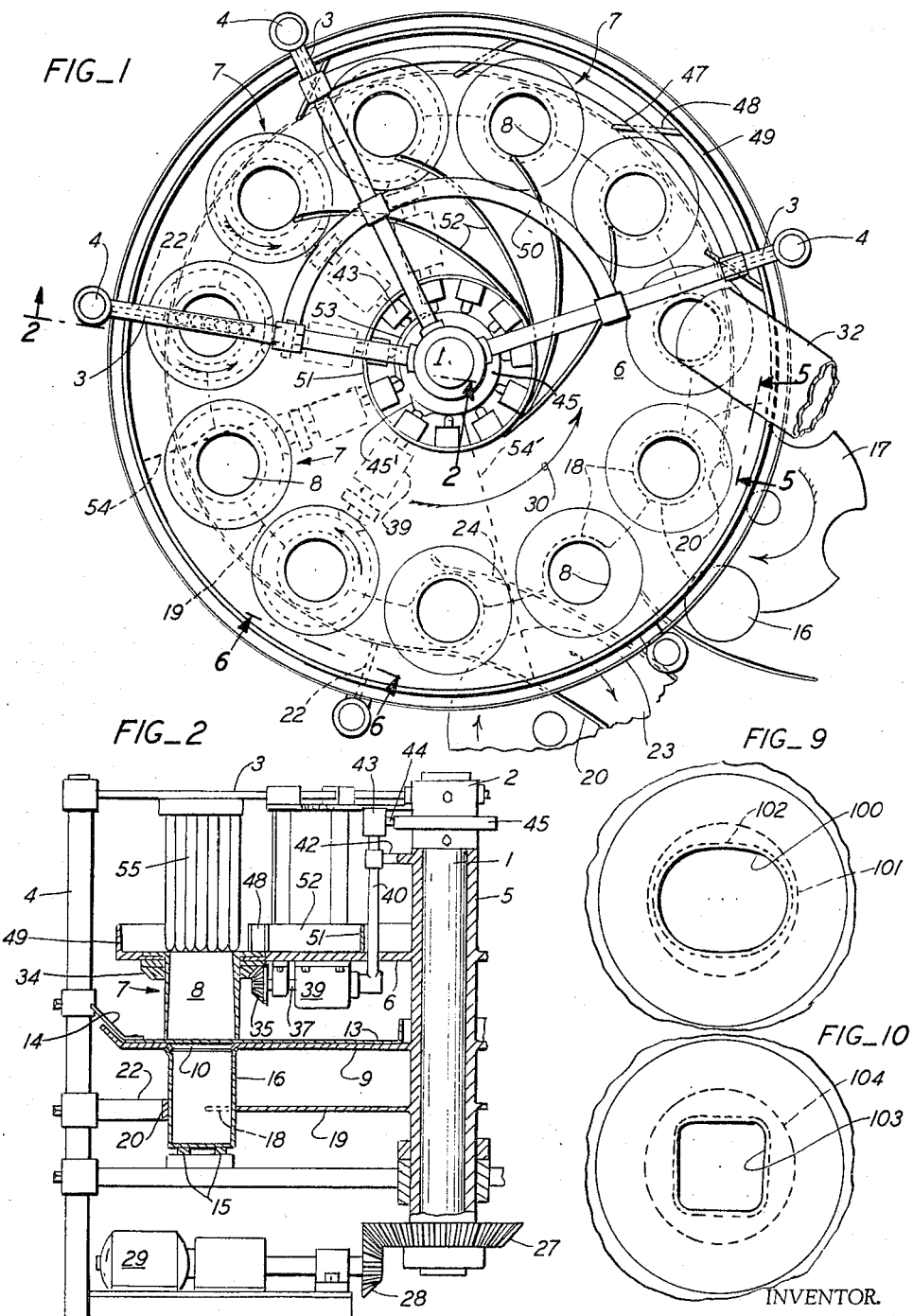

3,285,294
CAN FILLING MACHINE AND METHOD
Salvador A. Minera, 1500 Judah St.,
San Francisco, Calif.
Filed Aug. 1, 1963, Ser. No. 299,382
16 Claims. (Cl. 141—1)

This invention relates to a can filling machine and to a method of filling cans, and has for one of its objects the provision of a machine for filling cans with the desired amount of fruit, vagetables and the like, without injury to the product or products that fill the cans.

A clearer understanding of the invention and its objects can be had by pointing out that in conventional can filling apparatus for filling cans with olives, grapes, peaches, cherries, diced fruit and diced vegetables in which some of the fruit or vegetables are whole bodies that may be pitted or not, where fruit is used, it is customary to overfill the cans and to then scrape off the surplus above the level of the upper open end of the cans by moving the cans below a fixed scraper, or by moving a scraper across the top of each can. United States Letters Patent No. 2,055,075 of September 22, 1936, is one example.

The above described conventional method results in some of the fruit or vegetable units being cut or mutilated. This is because the scraper shears off fruit bodies that project into the path of the scraper.

An object of the present invention is the provision of a machine and method by which the surplus fruit or vegetables that would be mashed or severed by a scraper, were such an element employed, are removed without injury to such surplus fruit or vegetable units.

Another object of the invention is the provision of a can filler in which a measured quantity of fruit or vegetables for each can is dropped, by gravity, into each can from a measuring receptacle, and in which the fruit or vegetables cleanly drop from such receptacle without necessitating the use of the customary air jet.

A still further object of the invention is the provision of can filling apparatus that embodies means for more efficiently filling cans than heretofore, without injury to the fruit or vegetable units.

Briefly described in the present invention vertically disposed receptacles that are open at their upper ends, and that are adapted to hold the desired amount of fruit for a can, are moved along a path of travel and the fruit or vegetable units from a bulk source thereof are directed into the upper open ends of the receptacles as the latter are moved along said path. The amount directed to the receptacles is in excess of the amount the can is to hold, in order to insure against a shortage or underweight in each can.

Assuming, for example, that the product to fill the can includes whole grapes, olives or cherries, by the present invention, the overfilled receptacle is rotated about about a vertical axis, and the surplus that projects above the level of the upper edges of the cans is thrown off by centrifugal force, and the receptacle may also be agitated and the projecting units lightly engaged by any desired flexible means during rotation of the receptacle to insure the discharge of such units. By this arrangement and method none of the projecting fruit units are cut or mutilated, as is the case where a scraper is used.

Where the cans are filled with one product only, such as cherries or olives, the receptacle that is rotated may include the can itself, but where the cans are filled with successive charges of measured units of different products, the measuring chambers are rotated. The principle, however, is the same in each instance.

In conventional equipment it is common to provide an upper, horizontal plate with an annular row of openings in its marginal portion. The plate is rotated about its vertical axis and the fruit or vegetable units are fed onto the plate and are shunted into the said openings. Carried by the plate and depending from the openings are the walls of measuring chambers of uniform size, while a lower fixed plate below the lower open ends of said chambers closes their open ends, except at a point where the cans are brought into register with the measuring chambers after the latter have been filled, and after the projecting units have been thrown off. At such point the contents of each measuring chamber drops into a can therebelow that is in register therewith.

In the present invention the measuring chambers are vibrated or agitated and are so formed as to insure a clean discharge of their contents into the cans, and their capacity is such that the cans are accurately filled to the desired level.

Other objects and advantages than those hereinbefore mentioned will appear in the description and in the drawings.

In the drawings, FIG. 1 is a top plan view of a filling machine that embodies my invention;

FIG. 2 is a vertical cross-sectional view taken generally along line 2—2 of FIG. 1;

FIG. 3 is an enlarged top plan view of one of the filling units;

FIG. 4 is a vertical cross-sectional view of the filling unit of FIG. 3 taken along line 4—4 of FIG. 3 showing part of a can only in a position for filling;

FIG. 5 is a semidiagrammatic view of a portion of the machine of FIG. 1 as seen along line 5—5 of FIG. 1;

FIG. 6 is a view similar to that of FIG. 5, but taken along 6—6 of FIG. 1;

FIG. 7 is a view similar to that of FIG. 4, but showing a modification in which the can itself is rotated in a filling operation;

FIG. 8 is a cross sectional view taken along line 8—8 of FIG. 7; FIGS. 9, 10 are top plan view of modified structures.

The filling machine that is illustrated is, in many respects, simplified. Many parts are illustrated as being in a single piece, whereas in actual practice they would comprise seevral elements bolted or screw together. Such differences, and others, have been made to avoid confusion and to more clearly and more directly deal with the invention.

A stationary frame is provided that includes a central vertical post 1, having a cap or sleeve 2 rigidly secured to its upper end, and horizontally extending arms 3 extend radially outwardly from said cap and connect at their outer ends with vertical stationary posts 4 (FIGS. 1, 2).

A vertical hollow shaft 5 (FIG. 2) is rotatable on shaft 1 and centrally secured to said hollow shaft 5 is a circular, horizontal plate 6 that is formed with an annular row of equally spaced apertures in each of which is rotatably supported the filling unit, generally designated 7, of this invention.

These filling units will be described more in detail later on. At this point, however, it should be noted that each includes a cylindrical measuring chamber 8 depending from plate 6, each measuring chamber being open at its upper and lower ends (FIGS. 2, 4).

Also secured to shaft 5 for rotation therewith and with plate 6 is a lower horizontal plate 9, and this plate is formed with a row of equally spaced circular openings 10 that are in registration with the lower ends of the filling units. The marginal portion 12 around each opening 10 may incline downwardly but in a direction toward the central axis of the opening.

Positioned between the plate 9 and the lower open ends of the cylindrical walls of the filling units, is a third horizontal plate 13 that is stationary, being secured by bracket arms 14 with the posts 4. This plate 13, as will later appear, masks off the lower open ends of the filling or measuring cylinders 8, until the latter arrive at a discharge station where the fruit or vegetables in each of the measuring cylinders will be discharged into a can.

Spaced below the annular row of openings 10 in lower plate 13 is a pair of horizontally spaced tracks 15 on which the cans 16 are adapted to be slidably supported for movement with the upper plate 6 and lower plate 9.

These tracks are annularly extending from an infeed point where a conventional horizontal rotary feeder 17 is adapted to feed cans 16 in equally spaced relation onto said tracks and into laterally radially outwardly opening recesses 18 (FIG. 1) in a horizontally disposed generally annular can mover plate 19 (FIG. 2) that is secured to the hollow shaft 5. These recesses in the can mover plate 19 position each can in vertical registration with the can filling units 7. A substantially annular band 20 is secured by arms 22 (FIG. 2) to posts 4 and extends around the row of cans that are on tracks 15 to hold the cans in the recesses 18. One end of the retainer band 20 terminates at one side of the can feeder 17 while the other end curves outwardly at a point adjacent to other side of the feeder 17 and across a conventional rotary discharge disc 23 that removes the cans from the filling machine. A stationary guide strip 24 (FIG. 1) extends across the path of the cans to deflect the cans from the can mover plate onto the discharge disc 23, said guide strip 24 being parallel with the curved end of the band 20 where the latter extends across disc 23.

Both the feeder plate 17 and discharge disc 23 are power driven in the direction of the arrow that is shown on each in FIG. 1.

The tracks 15 are formed with upwardly inclined portions 25 (FIG. 5) adjacent to the feed disc 17 to elevate the cans so that the flanges 12 on plate 9 will extend slightly into the upper open ends of the cans, and downwardly inclined section 26 (FIG. 6) are adjacent to the discharge disc 23 so the cans will be lowered and free from the flanges for discharge from the filler.

The lower end of the hollow shaft 5 carries a bevel gear 27 (FIG. 2) the teeth of which are in mesh with the teeth on a bevel gear 28 that is driven by a motor 29. The direction of rotation of the hollow shaft 5 is such as to drive the upper plate 6, lower plate 9, and can mover plate 19 in the same direction, or in the direction of the arrow 30 (FIG.1).

Fruit, vegetables or whatever is to fill the cans, may be fed onto the upper plate 6 at a point adjacent to the feeder 17 after the cans are against the flanges 12 on lower plate 9. A conveyor, chute or other suitable means, as indicated at 32, may provide a bulk supply of fruit, vegetables or the like for discharge onto upper plate 6.

The foregoing structure is conventional, in that it is found in can filling apparatus.

Referring to the filling units 7, each of these is identical, and each cylinder 8 of each unit is formed or provided with a radially outwardly projecting, horizontal, circular flange 33 that is rotatably supported in an aperture formed in the upper plate or table 6. The upper surface of each flange 33 is preferably flush with the upper horizontal surface of the plate or table 6, and the said table is recessed on its upper side around the aperture formed therein, and through which aperture cylinder 8 projects, to receive the flange 33 and to provide a supporting surface for the flange. Secured around cylinder 8 below the table 6 is an annular gear ring 34 having radially outwardly and downwardly directed teeth adapted to mesh with the teeth on a bevel gear 35. A set screw 36 or any other suitable means may secure the gear ring to the cylinder 8. (FIG. 4).

A horizontal shaft 37 carries gear 35, which shaft extends radially inwardly toward the axis of shaft 1, and a bearing 38 may rotatably support each shaft, each bearing being secured to the underside of table 6, and a separate electrical motor 39, also carried by table 6, is connected with each shaft (FIGS. 1, 2) for driving the latter.

An enclosed conduit 40 for the conductor wires for the motor extends from the motor upwardly through table 6 and is supported by any suitable bracket 42 to the hollow cylinder 5. A switch 43 at the upper end of each conduit 40 is provided with a radially outwardly extending switch actuating member 44 that is adapted to be actuated by engagement with a stationary cam 45 (FIG. 2) secured on the upper end of post 1 for actuating each motor during a portion of the movement of each can filling unit in its circular path around said post 1. During the remainder of the movement of each can filling unit in said path, the unit may be stationary, but when the motor 39 is actuated by actuation of its switch element 44 under the influence of cam 45 the filler unit 7 will be rotated.

The radially inner surfaces of each cylindrical member 8 is preferably substantially cylindrical, but slightly outwardly divergent in a downward direction, and the vertically extending passageway defined by said inner surface is slightly eccentric relative to the central axis of the member 8. Thus upon rotation of the member about its axis there will be a vibratory movement of the body of material within the cylinder. Furthermore, formed on the inner surface of each cylinder 8 is a slightly inwardly projecting helical ridge or thread 46 that may make at least one complete turn within the cylinder from its upper to its lower open end. This ridge may be relatively wide from its upper to lower side, but its radially inwardly and upwardly facing surface 47' (FIG. 4) smoothly merges with the inner surface of the cylinder so that produce within the cylinder will readily slide downwardly over the ridge, while the generally downwardly facing surface 48' is more abrupt, to tend to force any produce below the ridge in a downward direction when the cylinder 8 is rotated. The direction of rotation of the cylinder is such as to tend to effect this result.

Assuming whole cherries, pitted or unpitted, are being fed into the filling units 7, such cherries will be fed onto the table 6 by any suitable conveyor, chute, or conduit 32, some of the cherries may fall into the filling units 7 as the latter pass the feeder, while others may fall on the table or plate 6.

In any event, the stationary plate 13 below the filling units will close the lower open ends of the latter, and all of the cherries will be carried in a counterclockwise direction, as seen in FIG. 1.

Carried by stationary radial, overhead arms 3 is an arcuately extending rod 47 from which are suspended a plurality of vertically disposed guide or fruit deflecting plates 48 that extend over the table 6 and inwardly from the vertically disposed upstanding annular wall 49 that is around the outer periphery of table 6 and that is rigid therewith. These deflectors 48 extend slantingly from the outer wall 49 in the direction of travel of the upper plate or table 6, and to the edge of the central opening in each filling unit 7. Thus cherries on the plate 6 between the wall 49 and the openings in each filler unit will be deflected into the upper open end of each unit.

Suspended from a second arcuately extending rod or bar 50 that is carried by radial arms 3 are vertically disposed inner deflectors 52 that extend from the shaft 5 to the radially inner edges of the openings in the filler units 7, and these deflectors extend outwardly from an annular upstanding wall 51 generally in the direction of travel of the filling units 7. Thus cherries on plate 6 between the filling units and the wall 51 will be deflected from the table or plate 6 into the upper open ends of the filling units.

These deflectors 48, 52 are positioned only over part of the upper surface of plate 6 that extends away from the cherry feeding means 32 but after the point where the last of the filling units pass the last of the deflectors each motor 39 may be actuated by the switch actuator 44 engaging the riser 53 on cam 45, whereby the filler unit will be rotated and at the same time vibrated to settle the cherries that are within the filling units, and while any surplus cherries projecing above the upper level of the filling unit will be thrown outwardly of the filling unit by the rotation of the unit onto the portion of plate or table 6 that surrounds each filling unit.

Each motor 39 will continue to rotate the filling units after they have left the last pair of deflectors 48, 52 and those cherries projecting above the level of the filling units will be thrown away from the upper flange 33 of each unit, but should any cherries still partially project above the filling units, they will be carried below the lower ends of a plurality of relatively soft, flexible, depending fingers 55 (FIG. 2) that are suspended from one of the bars 3. The lower ends of these fingers terminate substantially even with the upper surface of the plate 6 and flanges 33, so as to tend to cause any upwardly projecting cherries to roll on those below and to be thrown radially outwardly of the filling unit over flange 33.

At approximately point 54 (FIG. 1) the plate 13 may terminate so that the contents of the filling units will be discharged into the cans, and the plate 13 again starts at about point 54' to close the lower ends of the filling units. Each motor 39 may stop, due to dwell point on cam 45, as soon as the material is discharged into the can, but before the can reaches the discharge disc 23 a riser 45' on cam 45 may momentarily spin each filler unit before the cans arrive at the discharge element 17. Thus any pieces that may tend to cling in each filler unit will be loosened to drop into the can.

The helical rib 46 in each filling unit, and the outwardly tapered inner sides, including the vibration of the unit due to the eccentricity of its central opening (and consequent unbalance) will contribute to a quick and complete discharge of the cherries without the use of a compressed air jet now commonly used, or any other auxiliary means.

It will be seen that no scraper is employed to level off the filling units, and the cherries are thrown clear of flange 33 to re-enter the cans when they engage the deflectors 48, 52.

The riser 45' on cam 45 may be at approximately the point where the inclined portion 26 of the can supports causes the cans to start moving downwardly away from the plate 9, and the rotation of the filling units will stop until the switch elements are again actuated by the riser 53.

It is obvious that the filling units may be made of different capacities, merely by using a larger or smaller internal bore, and the units may be quickly changed, as desired, according to the fruit that is being discharged into the cans.

Where cocktail fruit is being packed one can filler may be for cherries, another for grapes and others for the diced fruit. Thus the cans may be conducted from one machine to another, each discharging its desired quota of fruit into each can until the can is filled to the desired degree.

Where the can is to be filled with only one fruit such as grapes, cherries, olives, peaches, pineapple, etc. the structure of FIG. 7 may be employed in which the depending cylinder portion 8 of each filler is omitted. Instead an annular member 56 may be rotatably supported in each aperture in the plate 57, which corresponds in function and position to plate 6. This member 56 has a central vertically directed eccentrically positioned bore 58 with divergently downwardly extending sides and an annular downwardly opening recess 59 in which is a resilient washer 60 against which the upper edge of can 62 is adapted to be urged.

The marginal portion 63 of the aperture in plate 57 extends between the radially outwardly projecting flange 64 on member 56 and a radially outwardly projecting bearing 65 on said member. Ball bearings 66, 67 may be disposed between flange 64 and the said marginal portion 63, and between the latter and said bearing 65 to rotatably support member 56.

There is no masking plate 13 in this form of the invention since the fruit goes directly into the can. Tracks 70 substantially corresponding to tracks 15, may slidably support the carriages 71 that, in turn, rotatably support the cans 62. A plate 73, corresponding to plate 19, in function, is secured to the central hollow rotatable post of the filler, it being formed with radially outwardly opening recesses to receive each can in the same manner as plate 19 in FIG. 2.

Each carriage 71 may comprise a cylindrical base 74 onto which cans from a conventional can feeder, such as 17 in FIG. 1, are fed. This base 74 has guide lugs 75 that project between tracks 70, so as to retain the bases 74 on said tracks, and base moving plates 76, rigidly connected with the plate 73 by vertical legs 77 on plate 96, have yoke arms 78 between which the bases 74 are received and which base moving plates function to move the carriages along tracks 70 in registration with the filling apertures 58 of the rotary members 56. Lugs 79 on arms 78 extend into vertical grooves 80 at opposite sides of said bases 74 so that the carriages may move vertically to raise and lower the cans along the portions of tracks 70 that correspond to portions 25, 26 of FIGS. 5, 6.

Rotatably supported on each base 74 is a can support 82 that includes an annular member 83 adapted to be rotated by a motor 84 that is carried by the can engaging plate 73.

This member 83 has a bevel driving surface 85 that is adapted to be frictionally engaged with the correspondingly beveled friction surface of a rotary driving member 86 that, is turn, is driven by motor 84 through intermeshed gears 87.

The rotary driving member 86 may be splined on shaft 89 and yieldably urged downwardly by a wave spring or the equivalent reacting between member 86 and collar or washer 90 secured on said shaft. By this arrangement, when the member 83 is moved upwardly so that its bevelled friction surface engages the correspondingly bevelled friction surface of member 86, the two surfaces will be in yieldable driving engagement whereby member 83 and cans 72 will be rotated upon actuation of motor 84. Each motor 84, in turn, may be connected through a conduit with a switch corresponding to switch 43, all in the same manner as each motor 39 in FIGS. 1, 2 are connected with switches 43, it being understood that the same switch actuating means may be employed as in FIGS. 1, 2.

As noted in FIG. 7, the member 56 includes a downwardly directed annular flange 92 in which bore 58 is formed, and the vertical dimension of this flange is such that upon lowering of the can after the latter is filled to the level of the upper surface of flange 64 on the member 56, the can will be filled to the desired level by reason of the material within said flange 92 dropping into the can.

It should also be noted that when the can carriages move the cans upward a frictional engagement under the yieldability of the washer 60, will be established between the can and member 56 so that the latter will be rotated with the can.

Substantially the only difference between the basic operation of the invention as disclosed in FIG. 7 and as disclosed in FIGS. 1-6 is that the filling chamber 7 of FIGS. 1-6 is substantially eliminated and the can rotates with the member through which each can is filled, although in FIG. 7 the member 56 still includes a passageway that is filled and the material in said passageway will drop into the can below.

It is to be understood that the present invention is not to be considered as restrictive to any particular fruit, vegetable or other object. Its use precludes injury to whatever is to be deposited in the cans, so that shredded, mashed and otherwise mutilated material will not be in the cans, and furthermore the present method and apparatus provides a more accurate and uniform measured weight of material for the cans.

While a conventional can filler structure has been disclosed as an example of structure in which the novel filling unit may be incorporated, it is believed to be apparent that individual units having a similar manner of operation may be used for providing measured quantities of fruit, vegetables and other articles without departing from the spirit of the invention, and in which the basic method may be substantially the same. It is therefore to be understood that the invention is capable of variation and modification from the form shown so that its scope should be limited only by the proper scope of the claims appended hereto.

In each of the forms of the invention that has been disclosed it should be noted that the body of fruit units, whether in the cylinder 8 of FIG. 4 or in the can 62 of FIG. 7, will rotate in unison with the cylinder 8 or can 62.

The provision of the flange 33 or 64 is desirable since it insures against any fruit falling back into the can since any fruit thrown or moved onto the rotating flange is immediately urged radially outwardly to a substantial distance from the filling opening.

While the helical rib 46 may be omitted in the case of certain kinds of fruit, in extending from the upper to the lower end of the filler unit it not only functions to increase the frictional resistance between the body of fruit within the filler unit and the walls of the latter, but upon the initial actuation thereof, and before the filling unit leaves the closure plate 13, and after it has passed the deflectors 48, 52, this rib will function to compact the fruit within the filler unit so that any fruit that might still project to a small degree above the upper level of the unit, will be moved downward. The downward divergence of the side walls also contributes to this result, since the fruit bodies within the tubular member 8 will tend to move downwardly under the influence of centrifugal force due to the downward divergence of the walls 8 when the filling unit and the body of fruit therein are rotated.

If desired, one or more conventional vibrators 95 (FIG. 7) may be carried by the plate 57 or by plate 6. In the form of the invention as shown in FIG. 7, it may be noted that the annular member 60 is compressible and is secured to member 56. Also, the legs 77 (FIG. 7) that connect the yoke arms 78 with the plate 73 are formed by the provision of an aperture in a vertical plate 96 (FIG. 8) from which the yoke arms 78 and legs 77 are formed. The shaft of motor 84 extends through said aperture in plate 96.

The ridges 47' (FIG. 4) will tend to prevent rotation of the filling units 7 relative to the fruit therein. However, where the fruit is quite slippery, the inside of each unit may be somewhat oval in cross sectional contour, as indicated at 100 in the filling unit of FIG. 9 while the outside contour 101 is cylindrical to register with the cylindrical can therebelow. The inner surfaces 100 extend divergently downwardly, the dotted line 102 indicating the lower end of the inner surface 100 of each filling unit.

In FIG. 10 the inside surface 103 of each unit is indicated as being substantially square in cross sectional contour, and here again the sides taper divergently in a downward direction. The outside of each filling unit is circular, as indicated at 104, the same as in FIG. 9.

By the structure of FIG. 4 the contents of a filling unit resists slippage relative to the latter by reason of the inwardly extending projection 47', and in FIGS. 9, 10 the noncircular or non-cylindrical inner surfaces function to accomplish the same result by positioning certain portions of the load eccentrically relative to other portions, thus providing means for holding the filling unit and contents together for rotation as a unit. The divergently downwardly extending inner surfaces of each filling unit not only provides a means for urging the contents downwardly in each filling unit upon rotation of the latter, but it also insures a clean downward discharge of the contents from each unit without the use of some extraneous means, such as a fluid.

I claim:
1. The method of filling a receptacle having an upper open end with discrete objects that comprises the steps of:
   (a) filling said receptacle through said upper open end with said objects to a level above that of said open end; then,
   (b) removing from said receptacle substantially only said objects that project above the level of said upper open end solely by centrifugal force by rapidly rotating said receptacle about a vertical axis, leaving said receptacle substantially filled with said objects to said level.

2. The method as defined in claim 1 that includes the step of:
   (c) moving said filled receptacle along a horizontally extending path of travel during said rotation thereof; and,
   (d) moving any of said objects that project above said level and that are at the same time substantially on said axis, laterally to one side of said axis, so they will come within a greater effective influence of said centrifugal force.

3. The method of measuring uniform amounts of discrete fruit units for packaging that comprises the steps of:
   (a) filling each of a plurality of upwardly opening, but otherwise enclosed, spaces of uniform volumetric capacity, to variable heaping relation with a body of said fruit units whereby each of said bodies will have a uniform predetermined amount of said fruit units, by volume, within each of said spaces with varying amounts projecting directly above the upper openings of and being supported on the body of fruit units within each of said spaces;
   (b) then removing the units of each body projecting above each of said spaces to the level of the upper opening of each of said enclosed spaces by rotating each of said bodies about its vertical axis at a sufficient rate to cause substantially only the units projecting above said spaces to be thrown off said bodies solely under the influence of centrifugal force.

4. The method of measuring uniform amounts of discrete fruit units for packaging that comprises the steps of:
   (a) filling each of a plurality of upwardly opening, but otherwise enclosed, spaces of uniform volumetric capacity, to variable heaping relation with a body of said fruit units whereby each of said bodies will have a uniform predetermined amount of said fruit units, by volume, within each of said spaces with varying amounts projecting directly above said spaces above the upper openings of the latter supported on the body of fruit units within each of said spaces;
   (b) then removing the units of each body projecting above each of said spaces to the level of the opening of the upper opening into each of said enclosed spaces by rotating each of said bodies about its vertical axis at a sufficient rate to cause substantially only the units projecting above said spaces to be thrown off said bodies under the influence of centrifugal force;
   (c) discharging each body downwardly and out of each of said enclosed spaces after the units projecting thereabove have been removed.

5. The method of measuring uniform amounts of discrete fruit units for packaging that comprises the steps of;
   (a) filling each of a plurality of upwardly opening, but otherwise enclosed, spaces of uniform volumetric capacity, to variable heaping relation with a body of said fruit units whereby each of said bodies will have a uniform predetermined amount of said fruit units, by volume, within each of said spaces with varying amounts projecting directly above the upper openings of said spaces and being supported on the body of fruit units within each of said spaces;
   (b) then removing the units of each body projecting above each of said spaces to the level of the upper opening of each of said enclosed spaces by rotating each of said bodies about its vertical axis at a sufficient rate to cause substantially only the units projecting above said spaces to be thrown off said bodies under the influence of centrifugal force;
   (c) vibrating each of said bodies during rotation thereof.

6. In apparatus for filling upright receptacles having open upper ends with fruit units:
   (a) a horizontally disposed support having an opening formed therein;
   (b) an annular member rotatably supported within said opening;
   (c) said member being formed with a central filling aperture;
   (d) side walls projecting downwardly from around said aperture and a bottom wall providing a receptacle adapted to be filled by fruit units directed through said aperture from above;
   (e) means for feeding and for directing fruit units into said aperture for filling said receptacle;
   (f) means connected with said annular member for rotating the latter including said receptacle and the fruit units within the latter, about the vertical axis of said member, whereby any fruit units projecting above the upper level of said aperture and within the upwardly projecting confines of the outline of said aperture will be moved radially outwardly of said aperture under the influence of centrifugal force during said rotation.

7. In apparatus as defined in claim 6:
   (g) said support comprising a horizontally disposed plate, and
   (h) said annular member having a radially outwardly projecting flange around said aperture rotatable with said annular member so that fruit units so moved radially outwardly of said aperture will continue to be moved across said flange and onto said plate under the said influence of said centrifugal force.

8. In apparatus as defined in claim 6:
   (g) said side walls and said bottom wall being the walls of a conventional can; and,
   (h) means frictionally connecting said can with said annular member for rotation of said can and said annular member as a unit.

9. In apparatus as defined in claim 6:
   (g) said side walls being substantially a cylinder connected with said annular member for rotation therewith as a unit and having a lower open end;
   (h) said bottom wall being separate from said side walls closing said lower open end;
   (i) means supporting said cylinder and said bottom wall for relative movement from closing position of said bottom wall in which the latter closes the lower open end of said cylinder to an open position in which said lower end is open and free for downward discharge of said fruit units from within said cylinder, and vice versa;
   (j) means for effecting said relative movement after said cylinder has been filled with said fruit units and after said rotation of said member; and,
   (k) means for supporting an upright can below and in vertical registration with said cylinder for receiving fruit units adapted to be discharged downwardly from said cylinder upon said cylinder and said bottom wall being in said open position.

10. In apparatus adapted to fill upright cans having open upper ends with fruit and the like;
   (a) a vertically disposed, tubular, measuring and filling unit having open upper and lower ends and side walls having divergently downwardly extending radially inwardly facing surfaces whereby the diameter of said unit at its lower end is greater than at its upper end, the upper open end of said unit providing an inlet for said fruit and said lower open end providing a discharge outlet through which fruit within said unit is adapted to be discharged into one of said cans when the latter is positioned below and in substantially vertical axial alignment with said unit;
   (b) a closure extending across the lower open end of said unit for holding fruit within the latter against discharge therefrom;
   (c) means supporting said unit for rotation about its vertical axis;
   (d) means connected with said unit for so rotating it about its vertical axis whereby fruit projecting above the upper level of said upper open end of said unit and within the upwardly projected confines of the outline of said upper end will be moved laterally away from said upper open end to substantially the level of the latter under the influence of centrifugal force due to said rotation of said unit and the corresponding rotation of the fruit within said unit;
   (e) means for filling said unit with fruit;
   (f) means for moving said filling unit and said closure relative to each other to a position in which said closure uncovers said lower open end for discharge of fruit within said unit after said unit has been filled with fruit and rotated; and,
   (g) means for supporting and for positioning a can below and in vertical axial alignment with said unit to receive therein the fruit so discharged.

11. In apparatus as defined in claim 10:
   (h) a radially inwardly projecting ridge formed on the radially inwardly facing surface of said unit extending generally downwardly from said upper open end.

12. In apparatus as defined in claim 10:
   (h) a radially inwardly projecting ridge formed on the radially inwardly facing surface of said unit extending helically about the vertical axis of said unit and arranged relative to the direction of rotation of said unit to urge fruit within said unit and in engagement with said ridge downwardly upon said rotation of said unit.

13. In a can filler for filling cans with fruit and the like that includes: a horizontally disposed table provided with a circular row of spaced openings, means for supporting a circular row of cans having open upper ends below said table with said open upper ends substantially in register with said openings in said table, means for revolving said table and said row of cans together about a common axis, the improvement that comprises:
   (a) an annular member positioned within each of said openings in said table having lateral side walls defining the lateral sides of the central opening in each annular member;
   (b) each annular member including a radially outwardly projecting flange having its upper surface substantially flush with the upper surface of said table whereby fruit on said table may be directed therefrom over said flange and to said central opening in each annular member free from interference by said flange;
(c) guide means above said flanges and table for guiding fruit on said plate across said flanges and into the central openings in said annular members upon revolution of said table;
(d) means supporting said annular members and said flanges for rotation relative to said table about the vertical axis of each member;
(e) means connected with said annular members for rotating them relative to said table for discharging fruit therein projecting above the upper surface of said member under the influence of centrifugal force during said rotation;
(f) means for discontinuing rotation of said annular members during a portion of the movement of said table about the central axis of the latter.

14. A can filler as defined in claim 13:
(g) each of said members being adapted to hold a predetermined uniform quantity of fruit for the can therebelow;
(h) a stationary horizontal masking plate having a masking portion thereof extending across and closing the lower end of the filling aperture in a predetermined number of said members for supporting the fruit within each of said members against discharge into said cans and said masking portion terminating at a point around said table whereby fruit supported on said masking plate within said member will be discharged downwardly into the can therebelow upon each member passing said point.
(i) said guide means being spaced from said point circumferentially of said row of members and being positioned above said masking plate only whereby said members will be filled with fruit before said members reach said point;
(j) said means for rotating each member being actuated for effecting said rotation after said members have moved past said guide means and for a predetermined time after said members have moved past said point.

15. In can filling apparatus that includes a generally vertically disposed filling unit having open upper and lower ends for respectively receiving fruit and for discharge of said fruit therefrom;
(a) said unit having inner surfaces extending divergently downwardly substantially to said lower open end to facilitate discharge of said fruit therefrom;
(b) a horizontal closure over said lower open end for holding fruit in said unit against discharge from said lower open end;
(c) means supporting said closure and said filling unit for movement of one relative to the other to a position in which said lower end is open, to permit discharge of the contents of said unit through said lower end;
(d) means connected with said unit for rotating it about a vertical axis when filled with fruit;
(e) means on said unit for holding said filling unit and the contents thereof for rotation together about said vertical axis when said lower end is closed by said closure.

16. In apparatus as defined in claim 15:
(f) said last mentioned means comprising portions on the inner sides of said unit adapted to support portions of the contents of said unit in eccentrically disposed positions relative to adjoining portions of said contents and to said vertical axis.

References Cited by the Examiner
UNITED STATES PATENTS

| | | | |
|---|---|---|---|
| 893,583 | 7/1908 | Hey et al. | 141—145 |
| 2,055,075 | 9/1936 | Gardner | 141—133 |
| 2,462,840 | 3/1949 | Borg. | |
| 2,775,268 | 12/1956 | Echart | 141—168 X |

LAVERNE D. GEIGER, *Primary Examiner.*

SAMUEL ROTHBERG, *Examiner.*

E. EARLS, *Assistant Examiner.*